Nov. 25, 1952  J. H. LANCOR, JR  2,619,605
VIBRATION OR IMPACT INDICATOR
Original Filed Jan. 10, 1944
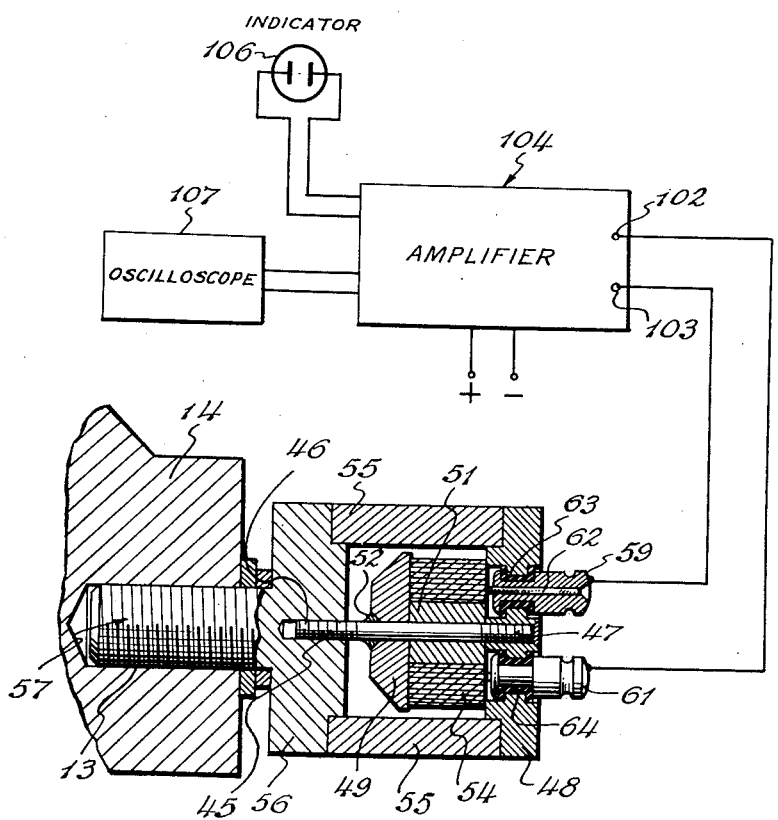
INVENTOR
JOSEPH H. LANCOR, JR.
BY
Herbert H. Thompson
HIS ATTORNEY.

Patented Nov. 25, 1952

2,619,605

UNITED STATES PATENT OFFICE 2,619,605

VIBRATION OR IMPACT INDICATOR

Joseph H. Lancor, Jr., Silver Spring, Md., assignor to The Sperry Corporation, a corporation of Delaware Original application January 10, 1944, Serial No. 517,657. Divided and this application December 3, 1949, Serial No. 130,979

4 Claims. (Cl. 310—26)

My invention relates to vibration pick-up devices in general and their use in vibration detecting systems, and concerns itself primarily with vibration pick-up devices especially adapted to detect detonation in combustion engines, or other sudden, high frequency impacts. This application is a division of my prior application for Vibration Pick-up Device and Systems, now Patent No. 2,534,276, December 19, 1950, and constitutes an improvement of the detonation detector of the type shown in my joint patent with C. S. Draper, No. 2,275,675, for Detonation Detector Systems, dated March 2, 1942. This type of detector is externally mounted on the cylinder wall of an engine as distinct from the prior type, such as shown in the patent to Draper, No. 2,202,900, dated June 4, 1940 for Indicating Apparatus, which requires a hole in the cylinder wall so that the pressure of the gases within the cylinder was transmitted directly to a diaphragm forming a part of the detonation detector. The system of my joint patent with Draper marked a great advance over the prior type requiring a hole in the cylinder wall, since it was found that the vibrations imparted to the cylinder wall by detonation were sufficient to detect detonation and violent impacts of that nature in a better manner than the prior type in which the direct effect of the explosion in the cylinder on the diaphragm was mixed with the resulting vibration of the cylinder walls and attached housing of the detonation detector.

According to my present invention, I further simplify and improve the later type of detonation detector by confining the signal produced to a single phenomenon, namely, the variations of the magnetic lines of force in the coil by variation in the magnetostrictive effect on a rod placed under stress against the cylinder wall. In the aforesaid prior Draper and Lancor device, the variations in a magnetic gap were caused by detonation due to the difference in periodic frequency between the diaphragm connected at a spaced point or points to the cylinder wall and a magnetic pick-up coil and core; but other effects of the high frequency detonation such as that due to magnetostrictive effects in the metal core cause the results to be somewhat uncertain and non-uniform.

According to my present invention, I endeavor to confine the effect of the vibrations due to detonation to the magnetostrictive effect upon a magnetostrictive member placed under initial stress or tension and tightly secured to a cylinder wall. No air gap is therefore employed and when detonation occurs the stress in the magnetostrictive element is rapidly changed due to the resulting vibrations, said changes effecting a change in the number of magnetic lines threading the coil surrounding the magnetostrictive element thereby producing an E. M. F. generally proportional to and in phase with the vibrations of the vibrating member.

As an object of my invention, I wish to provide a vibration pick-up device in which changes in the physical characteristics of a vibratory mass vary the number of magnetic lines threading a coil to induce therein electromotive forces which are proportional to higher order derivatives of the vibrations occurring in a vibratory member, i. e., the rate of change of vibratory accelerations.

It is also an object of my invention to provide a magnetostrictive vibration pick-up device which may be used in connection with a detonation or other impact or shock detecting system and which is adaptable for external mounting on the apparatus in which the detonation or shock is to be detected.

It is an object of my invention to provide a vibration pick-up device in which a wire coil is associated with a permanent magnet whose lines of force form a magnetic circuit which interlinks said coil and in which is interposed a magnetostrictive element arranged to be responsive to the vibrations of a vibrating member. Moreover, the magnetostrictive element is selected to have a natural frequency of vibration higher in order than the frequencies of vibrations to which it is responsive, and is operable to alter the number of magnetic lines threading said coil in accordance with changes in the permeability of the element due to stresses set up by external vibrations.

Yet another object of my invention is to provide a detonation system in which a magnetostrictive pick-up device is arranged for external mounting on a cylinder or the metal part subject to an impact in which detonation is to be detected and which is associated with a cylinder selector switching means, a variable timing means, an amplifying device, and a visual indicating means, in such manner that the phenomena of detonation may be observed and indicated as occurring in individual cylinders or in a plurality of cylinders and which may be isolated from other vibration patterns set up in the cylinder walls due to valve action, etc., as shown in my aforesaid parent application.

By my invention, I provide an engine analyzer in which vibrations indicative of conditions capable of causing engine failures and of maladjustments may be detected in their incipient state by means of a magnetostrictive vibration pick-up element permanently or temporarily mounted on the engine's cylinder walls and elsewhere, and associated with a selector switching device and variable timing means in such a manner that electromotive forces generated in the pick-up devices may be selectively passed to a visual indicating means in which the wave patterns characteristic of maladjustments occurring within the engine may be observed and analyzed.

In carrying out my invention, I provide a permanent magnet in the form of a ring or hollow cylinder which is contained in or forms a suitable housing for the entire unit. Within the magnet is a rod or stud formed of material exhibiting pronounced magnetostrictive properties and located within the field of the magnet. The stud is preferably placed under tension to clamp the magnet under compression and there is usually secured to the stud a mass increasing its inertia. The unit is securely fixed to the cylinder wall or to whatever device is being tested so that when detonation or other high frequency oscillations occur, high frequency stresses are set up in the magnetostrictive device thereby changing the number of magnetic lines passing therethrough. This action induces an electromotive force in a pick-up coil around the rod and thus interlinked by these magnetic lines of force, which alternates at a frequency equal to the frequency of vibrations of the vibrating member and with an amplitude which is a function of both the frequency and amplitude of said vibrations. Suitable electrical connections and wiring lead the potentials generated in the coil to any suitable form of indicator, such as an oscilloscope or neon lamp.

The single figure shows a vertical section of one of my improved detonation detectors with diagrammatic connections to an indicator.

My detonation indicator is shown as made up of a rod 45, which is preferably of magnetostrictive material, such as an alloy high in nickel content, and is shown threaded at each end. One end 47 of the rod 45 is screwed and staked into the top plate or cover 48 of the device, the other end 46 threaded into bottom plate 56 forming the base of the unit. A coil of fine wire 54 is wound around the non-magnetic ring spacer 51 which is clamped between the top plate 48 and the coil retainer 49 staked to the rod at 52 and which adds to the inertia of the rod 45. A permanent magnet 55 which is cylindrical in shape is placed around the coil assembly and is held tightly clamped, that is, under compression, between the top plate 48 and the base 56. Said base has extending therefrom a threaded stud 57 adapted to be threaded into a tapped hole 13 extending part way into vibratory member 14 to which the pick-up device may be attached. If such member is a cylinder wall of an engine, the hole 13 should not extend through the wall.

The sensitivity of my device may be adjusted by varying the amount of tension imposed upon the rod 45 in asemblying the device. Terminal connections 59 and 61 are provided for receiving electromotive forces induced in the coil 54 and the ends of the latter are connected therewith by conductors, such as 62, which are insulated from the top plate 48 by insulators 63 and 64.

My detonation detector may be connected to any suitable form of indicator, such as an oscilloscope 107 or neon lamp 106 or both through a suitable amplifier 104, the connections 59 and 61 being connected to input terminals 102 and 103 on the latter. As explained in my aforesaid parent application, if the device is used for detecting detonation in a combustion engine, selective switches may be interposed between the pick-up unit and indicator for the purpose of confining the indications to the period of the cycle when detonation occurs and also for studying the behavior of any one of a plurality of cylinders of a multi-cylinder engine.

In operation my pick-up device is screwed into and therefore vibrates with the cylinder wall or other metallic member under test. Since the vibration produced by the phenomenon of detonation is usually on the order of approximately $10^4$ cycles per second and $10^{-8}$ inches in amplitude, it is possible for my pick-up device to discriminate between vibrations of considerably larger amplitudes and lower frequencies. The mass of the rod 45 together with that of the parts clamped to it 49 and 51, are so selected that it has a natural frequency of vibration in excess of the frequencies produced by detonation within the cylinder wall. Because of this fact, the pick-up device operates, in a sense, as an accelerometer and electromotive forces are induced in the coil winding 54 which are proportional to higher order derivatives including at least the third derivative of the vibrations set up by detonation.

As will be apparent to those skilled in the art, it is, of course, possible to provide a system, such as that described, with filter circuits which will render the system inoperative to pick up the large amplitude, low frequency vibrations that interfere with the study of detonation. Such precaution is not necessary, however, in a system provided with my pick-up, since the mass and dimensions of the magnetostrictive element may be so chosen as to make it responsive only to higher order derivatives of the vibrations detected. The electromotive forces generated in each of the pick-up devices are produced by a change in the number of magnetic lines threading the coil and its magnetostrictive core 45, which emanated from the magnet 55. This change is produced by the stresses set up in this element by the variations in stress resulting from the vibration of the cylinder wall and transmitted through the stud mounted base of the pick-up device. Due to the change in the number of lines interlinking the coil, electromotive forces are induced in the latter and are transmitted through the connections 59, 61 provided on the pick-up and thence through suitable leads to terminals 102, 103 on the amplifier 104. Preferably, the field strength of the magnet 55 should be maintained at a level such that the magnetostrictive rod 45 will not become saturated.

In aircraft applications, where the detection of detonation is of considerable importance, it is often not feasible to burden the pilot with the duty of observing on the screen of an oscilloscope the various vibration patterns, nor is it feasible in some installation to encumber the plane with the added weight of an oscilloscope. In these cases, an indicator such as that illustrated as the neon tube 106 may be provided on the panelboard of the plane and the amplifier 104 adjusted to the proper gain so that the tube will be fired only by, and to give an indication of the presence of detonation.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a vibration pick-up device adapted to be rigidly mounted on a surface comprising a housing including a rigid base and cover, a wire coil, a magnetostrictive rod rigidly held under tension between said base and cover, a hollow cylindrical magnet surrounding said rod and coil and clamped under compression between said base and cover by the tension of said rod, said rod extending through said winding, stud means rigidly attaching said base of said housing to said surface whereby vibrations in said cylinder will induce an electromotive force in the coil surrounding said magnetostrictive element as a result of the variation in magnetic characteristics of said element.

2. A device for detecting detonation in a cylinder of an internal combustion engine, comprising a housing adapted to be directly and rigidly attached to the outer wall of said cylinder, a magnetostrictive rod like weighted element secured at each end in said housing so as to place the rod under tension and thereby hold the housing together, said rod normally vibrating at a frequency approximating the detonation frequency characteristics of said engine, means for impressing a magnetic flux upon said element, and a winding linking said flux, so constructed and arranged that vibrations in the magnetic flux conductivity of said element due to vibrations set up by detonation in said cylinder will induce correspondingly varying electromotive forces in said winding.

3. A pickup or detector for indicating shocks to a body, comprising a rigid base adapted to be directly and rigidly connected to said body, a hollow cylindrical permanent magnet, a closure at each end thereof, of permeable material, a rod of magnetostrictive material threaded at each end into said closures so that when said rod is placed under tension, said cylindrical magnet is held under compression between said closures, and a pick-up coil surrounding said rod, in which a signal is induced upon shock by the variations in the magnetic flux threading said coil due to the magnetostrictive properties of said rod, said signal being adapted to actuate a vibration indicator.

4. A device for detecting detonation in a combustion engine cylinder comprising a rigid base adapted to be directly and rigidly connected to the outer wall of said cylinder, a sleeve of paramagnetic material on said base, a cap closing the outer end of said sleeve and a rod of magnetostrictive material threaded at its ends into said base and cap and serving to clamp the aforesaid parts together by being placed under tension, said rod having a substantial mass intermediate its ends, a magnetic circuit including said sleeve as a flux producing means and said rod, a winding surrounding a portion of said rod, the flux in said circuit varying with stresses due to forced vibrations in said rod caused by detonation in said engine cylinder to induce varying electromotive forces in said winding.

JOSEPH H. LANCOR, JR.

REFERENCES CITED

The following references are of record in the file of this patent:

UNITED STATES PATENTS

| Number | Name | Date |
|---|---|---|
| 1,616,416 | Fessenden | Feb. 1, 1927 |
| 1,882,401 | Pierce | Oct. 11, 1932 |
| 2,396,540 | Stansfield | Mar. 12, 1946 |
| 2,435,031 | Burns et al. | Jan. 27, 1948 |
| 2,445,318 | Eldredge et al. | July 20, 1948 |
| 2,472,127 | Slason | June 7, 1949 |